July 13, 1965

C. BROWN ETAL 3,194,639

PORTABLE MIXING MECHANISM

Filed May 17, 1962

CURT BROWN
LYLE B. OLIVER
INVENTORS
HUEBNER & WORREL
ATTORNEYS
BY

July 13, 1965  C. BROWN ETAL  3,194,639
PORTABLE MIXING MECHANISM
Filed May 17, 1962  3 Sheets-Sheet 2

CURT BROWN
LYLE B. OLIVER
INVENTORS
HUEBNER & WORREL
ATTORNEYS
BY
Richard M. Worrel

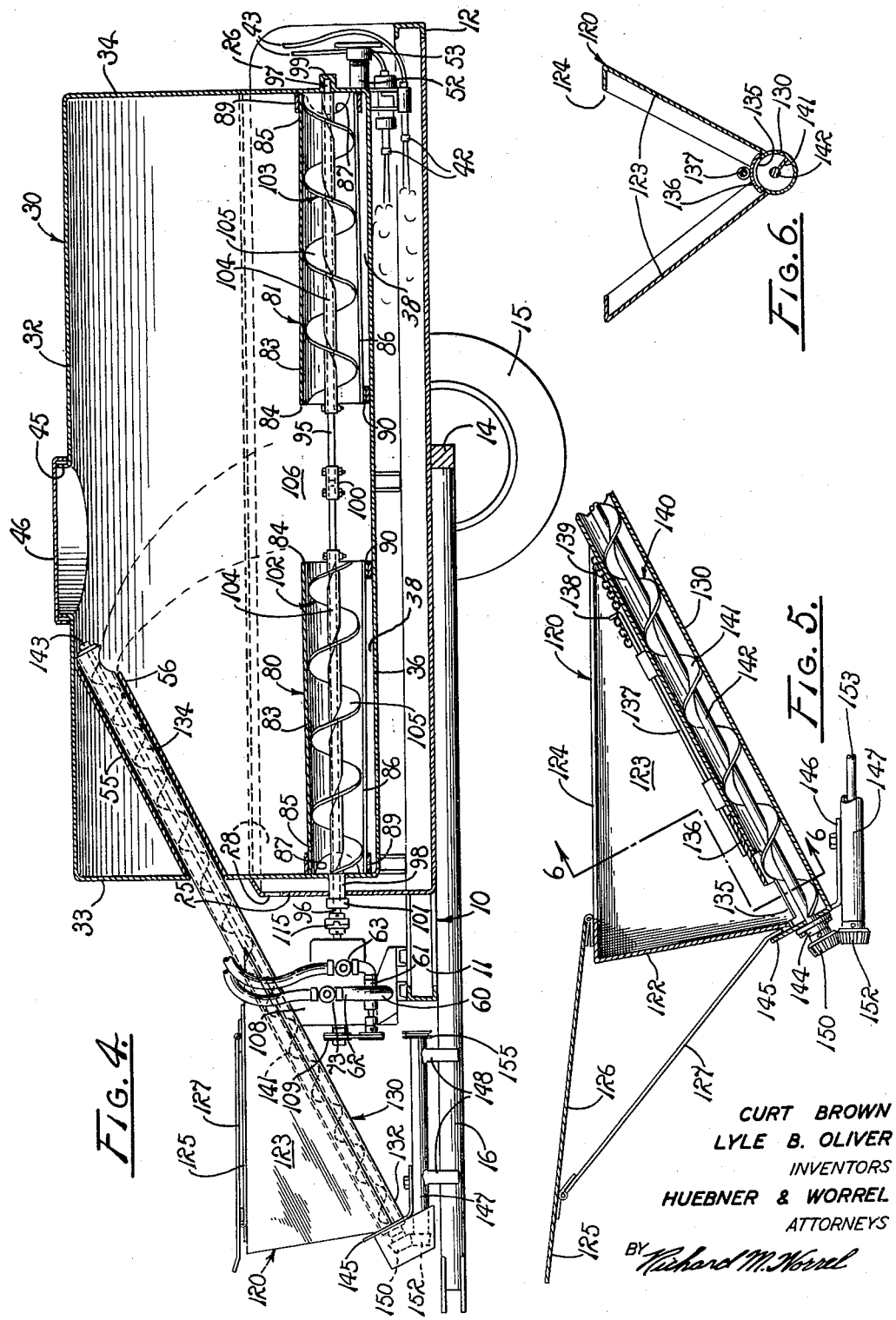

United States Patent Office 3,194,639
Patented July 13, 1965

3,194,639
PORTABLE MIXING MECHANISM
Curt Brown, 820 E. Lovers Lane, Visalia, Calif., and
Lyle B. Oliver, 16 Birch Ave., Reedley, Calif.
Filed May 17, 1962, Ser. No. 195,631
8 Claims. (Cl. 23—285)

The present invention relates to a portable mixing mechanism for manufacturing calcium polysulfide for use in soil treatment and sprays which provides improved dissolution in water of dry materials employed so as to minimize the development of residue settling and adherence of such residue and dry materials within the mechanism. The present invention provides a mixing tank of the general type disclosed in my co-pending application filed September 12, 1960, entitled "Method and Apparatus for Making Aqueous Solutions With Certain Dry Chemicals," Serial No. 55,243, now abandoned, and constitutes an improvement thereover.

As discussed in my co-pending application, conventional practices for manufacturing calcium polysulfide for use as soil conditioning fertilizers have been inefficient, expensive, inconvenient and generally unsatisfactory. Conventionally, this fertilizing material has been made by heating water in a large vat to a temperature of approximately 180° F. and then adding dry sulfur and lime with such mixture being agitated by a sweep or paddle oscillating through the liquid and across the bottom of the vat. After a predetermined time, a certain amount of the sulfur and lime passes into solution while a portion remains as residue. With such conventional practices, it is not possible to dissolve more than about 70 percent of the sulfur and lime even though quantities are employed which are within the maximum solubility thereof in water. Inasmuch as a relatively small percentage of the end product is obtainable from any one batch, the size of the vats employed in such practices have in the past prohibited the manufacture of calcium polysulfide in the field. Furthermore, if the fertilizer remains bottled for any extended period of time before use, the sulfur and lime tend to crystallize out of solution causing clogging of dispensing and spraying mechanisms employed in the field.

The mixing tank of the present invention is believed to overcome the above problems by providing a portable mixing tank for manufacturing calcium polysulfide in the field for immediate use.

Another object of the present invention is to provide an improved portable mixing tank for efficiently and conveniently making liquid calcium polysulfide.

Another object is to provide such a mixing tank for making liquid calcium polysulfide by forcing water under pressure into the pores of the dry materials employed therein.

Another object is to provide a portable mixing tank which minimizes the cost of making and using liquid calcium polysulfide.

Another object is to provide a portable mixing tank for manufacturing calcium polysulfide which releases a greater percentage of useful product than is possible by conventional practices.

Another object is to provide a portable mixing tank for making calcium polysulfide in the field which is adapted to use irrigation water in the manufacture thereof and which is adapted to deliver the completed product into irrigation water for distribution to the soil.

Another object is to provide a portable mixing tank which facilitates the useful disposition of any residue remaining after the manufacture of the liquid calcium polysulfide.

Othe objects and advantages of the present invention will become more fully apparent in the subsequent description in the specification.

In the drawings:

FIG. 4 is a longitudinal vertical section of the tank taken on line 4—4 of FIG. 1.

FIG. 5 is a somewhat enlarged fragmentary longitudinal section of the dray material loading conveyor and hopper taken on line 5—5 of FIG. 1.

FIG. 6 is a transverse vertical section through the conveyor and hopper taken on line 6—6 of FIG. 5.

FIG. 7 is a perspective view of a high pressure mixing tube removed from the tank of the preceding figures.

Figure 1:
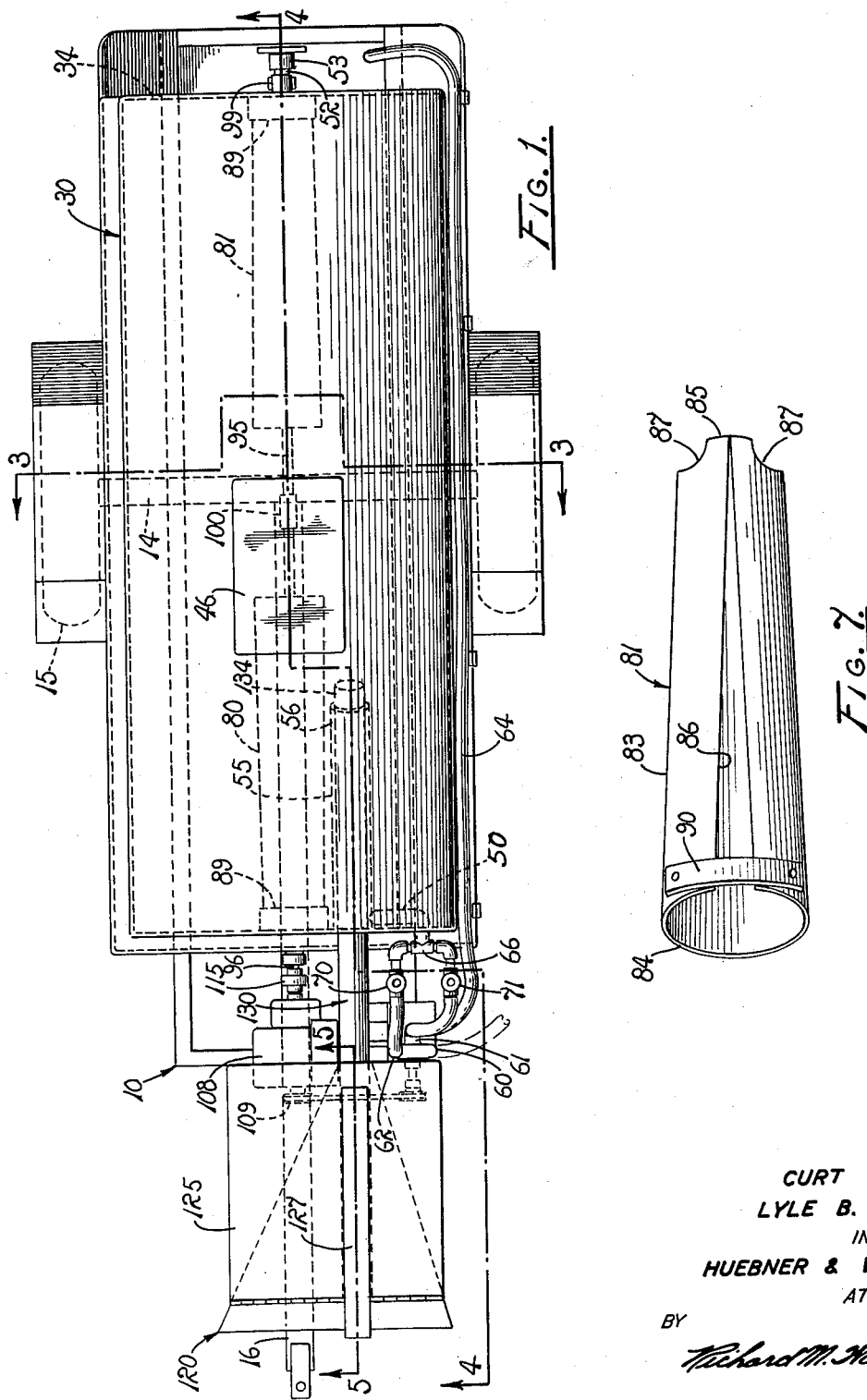
FIG. 1 is a top plan view of a mixing tank embodying the principles of the present invention.
Figure 2:
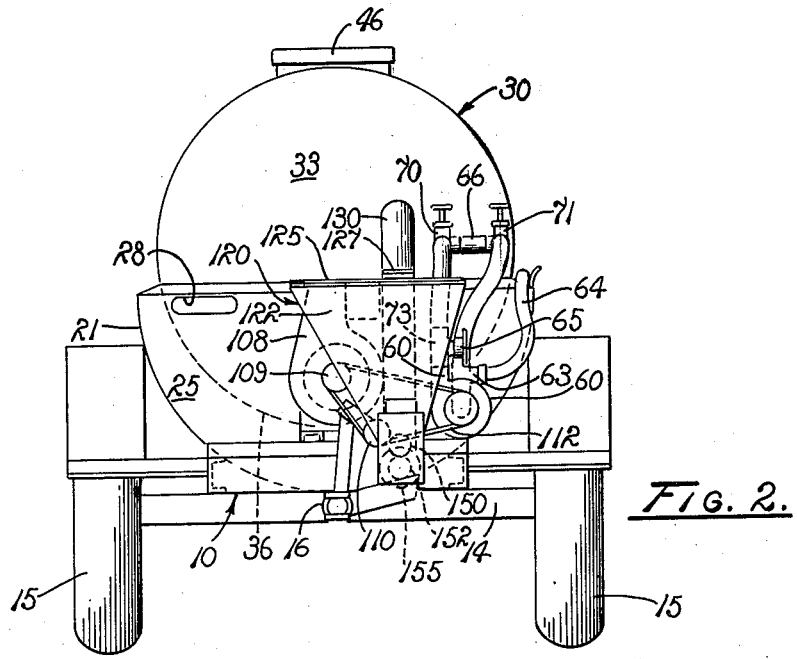
FIG. 2 is a front end elevation of the mixing tank of FIG. 1.
Figure 3:
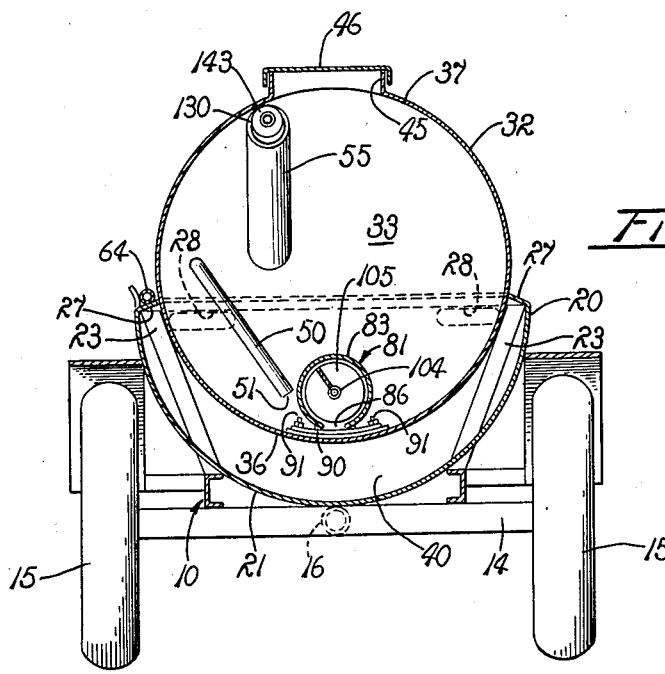
FIG. 3 is a transverse vertical section of the tank taken on line 3—3 of FIG. 1.

Referring more particularly to the drawings, a substantially rectangular frame 10 is best shown in FIG. 1 and 4 and includes a forward end portion 11 and a rearward end portion 12. An elongated axle 14 is extended transversely beneath the frame and is connected thereto for mounting a pair of support wheels 16 at opposite ends of the axle outwardly of the frame. An elongated tongue 17 is rigidly connected to the axle and extended forwardly from the forward end portion 11 of the frame, as best shown in FIG. 4.

An elongated semi-cylindrical auxiliary housing or shell 20 includes an arcuate wall 21 rigidly supported on the frame by a plurality of upwardly diverging brace members 23. The shell provides a forward end wall 25 and a substantially open rearward end portion 26. The arcuate wall and the forward end wall provide an upper inwardly extending flange 27 in circumscribing relation to an upper opening for the shell. The arcuate wall and the forward wall further provide a plurality of elongated exhaust ports 28 for a reason soon to be described.

An elongated tank 30 includes a substantially cylindrical side wall 32 concentrically circumscribing a longitudinal axis for the tank, and opposite forward and rearward substantially flat end walls 33 and 34, respectively. The tank is supported on the braces 23 and is connected to the flanges 27 of the shell 20 by means of welding or the like. The tank thereby provides a substantially semi-cylindrical bottom wall 36 disposed downwardly within the shell in spaced relation to the end and arcuate walls of the shell, and a substantially semi-cylindrical top wall 37 extended upwardly out of the shell. The lowermost portion of the bottom wall provides an elongated substantially horizontal sediment collecting area 38. The bottom wall of the tank and the shell define a chamber 40 therebetween. A burner nozzle 42 of any suitable type is mounted on the bottom wall of the tank adjacent to the rearward end 34 thereof in longitudinally inwardly extended relation beneath the tank. Gas supply pipes 43 are connected to the burner and extend rearwardly from the tank through the rearward open end 26 of the shell for connection to a source, not shown, of fuel oil or gas, as may be desired. The burner nozzle 42 thus is adapted to supply heat to the chamber 40 for heating the bottom wall and the contents of the tank.

The side wall 32 of the tank 20 provides an upper opening 45 in the upper portion 37 of the tank. A hinged cover 46 is provided for removably closing this opening. The forward end wall 33 of the tank has a liquid solvent or water conduit 50 disposed intermediate the upper and lower portions of the tank and bent downwardly to terminate in a lower open end 51 adjacent to the side wall 32 and the bottom wall 36 of the tank. A drainage duct 52 is connected to the rearward end wall 34 of the tank closely adjacent to the bottom wall thereof. A cap 53 is screwthreadably received on the outer end of the duct 52 for enabling opening and closing of the duct. An elongated tubular housing 55 is mounted in the forward end wall 33 of the tank to extend inwardly therefrom in upwardly angularly extended relation to provide an inner open end 56 rigidly mounted on the wall 32 of the tank adjacent to the upper opening 45 therein.

A pump 60 is mounted on the forward end portion 11 of the frame 10 and includes an inlet conduit 61 and an outlet conduit 62. A T fitting 63 is mounted in the inlet conduit 61 to provide connection for a supply and dispersing hose 64. The T fitting is adapted to be closed by a cap 65 when not in use. A T fitting 66 is mounted in the inlet 50 of the tank to mount a pair of valves 70 and 71 which are connected to the conduits 61 and 62 respectively for controlling the flow of liquid solvent in and out of the tank. A T fitting 73 is mounted in the outlet conduit 62 of the pump and may be alternately closed by the cap 65 or connected to the hose 64 depending on whether the pump is delivering liquid to or from the tank. The pump 60 further provides a forwardly extended drive shaft 75 on which is mounted a pulley 76 which is driven in a manner presently to be described.

A pair of spaced forward and rearward frusto-conical tubular housing members 80 and 81, respectively, are adapted to be rigidly mounted in coaxial longitudinally extended relation in the tank adjacent to the bottom wall 36. As best shown in FIG. 7, each of the tubular housings provides a substantially cylindrical wall 83 having an inner end 84 and a somewhat reduced diameter outer opposite end 85. A longitudinally extended slot 86 is provided in the housing in tapering relation from the inner end 84 toward the outer end 85. The outer end includes a pair of opposite transversely spaced semi-circular notches 87. The outer ends 85 of the housings are mounted in suitable brackets 89 secured, as by welding or the like, to their respective forward and rearward end walls of the tank in spaced relation to the bottom wall 36 of the tank. The inner ends of the housings are supported adjacent to the bottom wall of the tank by a pair of arcuate saddles 90 rigidly mounted on the bottom wall by a plurality of bolts 91. The saddles also maintain the desired separation of the housings from the bottom wall of the tank and thereby dispose the slot 86 downwardly so as to open adjacent to the bottom wall within the sediment collecting area 38.

An elongated shaft 95 has forward and rearward end portions 96 and 97 journaled in bearings 98 and 99 respectively mounted in the forward and rearward end walls 33-34 of the tank adjacent to the bottom wall 36 thereof concentrically aligned with the tubular housings 80 and 81. More specifically, the shaft extends longitudinally of the tank in spaced susbtantially parallel relation to the longitudinal axis of the tank and relatively adjacent to the bottom wall thereof. The shaft is separably fastened intermediate its ends by a drive coupling 100. The rearward bearing 99 is of the closed type whereas the bearing 98 in the forward wall of the tank includes a packing gland 101 to prevent leakage from the tank.

Forward and rearward sets of spiral screw type impellers 102 and 103 each include hub portions 104 which are rigidly mounted on the shaft 95 to provide blades 105 helically wound about the hubs. The hubs and impellers inwardly terminate adjacent to the inner ends of their respective tubular housings 80 and 81 to define a material receiving area 106 therebetween. The pitch of the blades of the opposite screw impellers 102 and 103 is oppositely wound so that upon rotation of the shaft in a predetermined direction the impellers force water in the tank axially outwardly from the receiving area toward their respective end walls. Such action creates a low pressure in the receiving area and a relatively higher pressure adjacent to the arcuate notches 87 of the housings. Of course, the pressure is progressively greater from the central low pressure area outwardly to said high pressure areas. Such high pressure is also adapted to be dispelled through the tapered slot 86 in the housings to provide a sweeping action against the bottom wall 36 of the tank.

An engine 108 is mounted on the forward end portion 11 of the frame 10 adjacent to the pump 60 and includes a drive pulley 109 in transversely co-planar relation with the pulley 76 on the pump. An idler pulley 110 is adjustably mounted on a bracket 111 upwardly extended from the tongue 17 of the frame 10 in co-planar relation with the engine pulley and the pump pulley to tighten the lower run of a V-belt 112 trained thereabout. The engine also provides a drive shaft coaxially rearwardly extended therefrom which is adapted to be connected to the screw shaft 95 by a releasable coupling 115 whereby upon energization of the engine the shaft 95 and the pulley 109 are rotated in said predetermined direction.

A material loading hopper 120 is disposed immediately forwardly and upwardly adjacent to the pump 60 and engine 108, as best shown in FIG. 4. The hopper provides a forward wall 121 and a pair of opposite upwardly rearwardly diverging side walls 123 which define a substantially V-shaped upper opening 124. The hopper is adapted to receive and to constrain a quantity of dry material such as sulfur, lime, or other solid solutes to be introduced into the tank 30. The upper opening 124 is adapted to be closed by a hinged cover 125 which provides an upper surface 126, when closed, to which is hingedly connected a support arm 127.

The hopper is adapted to be supported on a tubular conveyor housing 130 having a lower end 132 forming the bottom of the hopper and an opposite upper end 134 slidably positioned within the tubular material inlet housing 55. A material receiving opening 135 is formed in the lower end of the conveyor housing closely adjacent to the forward wall 121 within the hopper. The opening is adjustably controlled by a sliding panel 136 mounted upon the conveyor housing within the hopper. The panel provides an upwardly extended control rod 137 having an upwardly bent end 138 which is adjustably constrained against gravitational descent to close the opening 135 by way of the free end of a constraining chain 139, the upper end of which is rigidly secured to the conveyor housing 130.

An elongated screw conveyor having a continuous helically wound blade 141 is supported on a longitudinally extended shaft 142 disposed concentrically within the material conveyor housing 130. The shaft is mounted for rotation therein on suitable bearings 143 and 144 at the upper and lower ends of the conveyor housing. As best shown in FIG. 5, the lower end of the conveyor housing provides an upwardly extended flange 145 which is adapted to receive the lower end of the support arm 127 to support the cover 125 in the open position, as shown. The flange includes a foot portion 146 mounted on a tubular support member 147 as by bolting or the like. The tubular support member is rigidly mounted preferably as by welding to a pair of spaced arms 148 transversely outwardly extended from the tongue 17 of the frame 10. The lower end of the screw shaft 142 mounts a bevel pinion gear 150 which is adapted to mate with a similar bevel pinion gear 152 which is rigidly mounted on an elongated drive shaft 153 journaled in the tubular support member 147. The rearward end of the drive shaft 153 mounts a pulley 155 in co-planar relation to the engine drive pulley 109. The V-belt 112 is thereby adapted to be removable from the pump pulley 67 in order to be trained about the conveyor drive pulley 155. In this manner, when the engine is running, the screw conveyor 140 is motivated for carrying the dry material upwardly from the hopper for discharging the same into the water in the tank for descent into the material receiving area 106 between the mixing impellers 102 and 103.

*Operation*

The operation of the described embodiment of the subject invention is believed to be clearly apparent and is briefly summarized at this point. The portable mixing tank of the present invention is readily adapted to be drawn into a field which it is desired to condition or fertilize with the calcium polysulfide manufactured therein. The gas pipe 43 is connected to a portable source, not shown, of fuel oil or gas. In order to begin the manufacture of calcium polysulfide, the supply hose 64 is coupled with the T fitting 63 in the inlet conduit 61 of the pump 60, the valve 71 is closed, the valve 70 is opened, and the free end of the hose is immersed in irrigation water or other water source. The V-belt 112 is trained about the pump pulley 76, the idler pulley 110 and the engine drive pulley 109 so that with energization of the engine 108 the pump 60 is effective to deliver water into the tank by way of the inlet conduits 61 and 50. Assuming the tank has a capacity of 1,100 gallons, and it is desired to make from 500 to 600 gallons of calcium polysulfide, approximately 500 to 600 gallons of water are pumped into the lower portion 36 of the tank. One-half gallon of a suitable wetting agent, such as detergent in association with a white pine oil, is added to the water through the upper opening 45.

The burner nozzle 42 is then ignited to heat the chamber 40 and thus the water within the tank to a temperature of at least about 180° F. With the engine 108 running to drive the pump, the screw shaft 95 is concurrently rotated to drive the mixing impellers 102 and 103 so as to agitate and propel the water within the tank from the receiving area 106 outwardly therefrom through the tubular housings 80 and 81 and through the slots 86 therein along the bottom wall 36 of the tank. While the speed of rotation of the screw shaft 95 depends on various factors, under the assumed conditions set forth above and in commercial embodiments of the subject invention, it is rotated at a speed of at least about 400 revolutions a minute. In this regard, it is to be noted that the described commercial embodiment of the subject invention provides a screw shaft having a one inch diameter, impellers having individual convolutions of 18 inches in diameter and a tank which is approximately four feet in diameter by eleven feet long.

In order to energize the material conveyor 140, the V-belt 112 is removed from the pump pulley 76 and is trained about the conveyor drive pulley 155 to rotate the conveyor screw 145 by way of the beveled pinion gears 150 and 152. While maintaining the temperature of the water at about 180° F., dry sulfur is dumped into the hopper 120 and is delivered into the tank 30 by the screw conveyor 140 at a rate to prevent boiling and consequent foaming of the liquid. While this rate depends on the water conditions and the outside temperature, it has been found that in the commercial practice, a rate of approximately 100 pounds of sulfur every three minutes is excellently suited to the purpose. Preferably, 200 mesh sulfur is employed. Although 20 mesh sulfur can be utilized, the residue remaining is greater than when 200 mesh sulfur is used. However, it is also to be noted that even 325 mesh sulfur has been employed with success. The sulfur is motivated by the conveyor outwardly of the open upward end thereof to descend into the material receiving area 106 in the water intermediate the mixing impellers 102 and 103. The sulfur is immediately divided and driven axially forwardly and rearwardly through the tubular high pressure housings 80 and 81 and outwardly through the arcuate notches 87 adjacent to the forward and rearward end walls 33 and 34, respectively of the tank. It is to be noted that while the impellers are at rest the water in the area 106 would have a predetermined static head at a given depth and such head would constitute a standard pressure. During rotation of the impellers within their respective tubular housings, the water in the area of the arcuate notches 87 is at a relatively higher pressure. Conversely, the water at the receiving area 106 is at a relatively lower pressure. The increased pressure of the water within the tubular housings drives the water into the pores of the sulfur thereby facilitating and effecting dissolution of the sulfur into the water as it is recirculated through the arcuate notches 87 back to the receiving area 106 between the impellers. It is also to be noted that the wetting agent enables the sulfur to go into solution more rapidly. However, primary dissolving action is effected by the propelling action described. Additionally, the pressure created in the tubular housings 80 and 81 also prevents the sulfur from settling to the bottom of the tank and adhering thereto. The tapered slots 86 within the tubular housings direct a portion of the fluid therein downwardly therethrough along the bottom of the tank continually to stir sediment and propel the same upwardly into the water.

After all of the sulfur has been thoroughly wet, approximately 90 pounds of dry lime per hundred gallons of water are dumped into the hopper 120 which is motivated into the tank by the conveyor screw 140 at approximately the same rate as the sulfur. The lime also falls into the material receiving area 106 and is circulated with the water and the sulfur and is quickly driven into the solution in the same manner as described above for the sulfur. The burner nozzle 42 is turned off when the temperature of the liquid reaches approximately 200° F. to prevent boiling and foaming of the liquid. The liquid is continuously agitated by the impellers 102 and 103 until substantially all the sulfur and lime have gone into solution. It is to be noted that prior to dissolution of all of the dry materials, a crust forms on the top of the liquid. Within a period of about five minutes after the burner is turned off, the crust or foam drops whereupon substantially all of the dry materials pass into solution. If the agitation is continued for several minutes longer, even more of the material goes into solution and the solution clarifies into a relatively clear red or wine color.

To dispense the calcium polysulfide, the engine 108 is stopped in order to permit the changing of the V-belt 112 from the conveyor drive pulley 155 to the pump pulley 76. The valves 70 and 71 are respectively closed and opened and the supply hose 64 connected to the outlet conduit 62 of the pump by way of the T fitting 73. The closure cap 65 previously positioned thereon is interchanged with the hose to close the T fitting 63 in the inlet conduit 61 of the pump. The engine 108 is again energized to drive the pump which provides a suction force through the inlet conduit 50 to motivate the calcium polysulfide through the pump and outwardly of the hose 64 for delivery to the soil to be fertilized. In this regard, it is also noted that the wetting agent initially added to the water still retains its function of spreading the calcium polysulfide more quickly in the water and over the soil being treated. While approximately 95 percent of the sulfur and lime utilized is dissolved in the water, there is a minimum amount of residue in the bottom of the tank which does not go into solution. This residue can be flushed from the tank through the drainage duct 52 by removing the cap 53 therefrom.

From the foregoing, it is clearly evident that the structure of the present invention provides improved dissolution of the dry sulfur and lime materials used in the production of calcium polysulfide. It is significant that the water is driven or forced under pressure into the pores of the sulfur and lime thereby to facilitate their dissolution into the water in a minimum of time. Such pressure is further utilized to jet fluid against the bottom of the tank through the slots to prevent the settling of the sulfur and lime which, if not recirculated, is apt to adhere and build up on the inner surfaces of the tank to restrict further circulation. Inasmuch as the mixing tank is portable, the fertilizing product can be manufactured by a rancher at the site of its use. This enables utilizations of the ranchers' own irrigation water and avoids the problems of storage and enables immediate use of the liquid fertilizer before the dissolved materials therein have an opportunity to crystallize out of solution. This obviates cleaning of the tank outlet and the other expenses and inconveniences associated therewith.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mixing mechanism for manufacturing solutions of a solid solute comprising: a tank having a semi-cyclindrical bottom wall; means for introducing water and solid solute into the tank; a pair of spaced axially aligned tubular housings rigidly mounted in the tank in spaced relation closely adjacent to the bottom wall, each housing having oppositely opening ends and a longitudinally tapering slot therein adjacent to and directed toward the bottom wall; a shaft journaled longitudinally in the tank concentrically of the housings; a pair of longitudinally spaced helical screw impellers mounted on said shaft individually within said housings with the impellers being of opposite pitch; power means having driving connection to the shaft for rotating said impellers within their respective housings to force liquid through said slots in sweeping relation against said bottom wall to stir material tending to settle in the liquid; and means for releasing the aqueous solution from the tank.

2. An apparatus for producing aqueous solutions of a solid solute comprising, a tank having a substantially semicylindrical bottom wall, means for delivering water and solid solute to the tank; an auxiliary housing mounted externally on the bottom wall of the tank defining a heat chamber thereagainst; a pair of axially aligned substantially cylindrical housings mounted in spaced axially aligned relation in the tank adjacent to the bottom wall thereof, each of said housings having longitudinally spaced inner and outer ends and downwardly disposed longitudinally tapered slots disposed in spaced relation adjacent to said bottom wall of the tank and adjacent to said heat chamber; a shaft journaled longitudinally in the tank concentrically of the housings; a helical screw impeller mounted on said shaft within each of the housings; power means externally of the tank having driving connection to the shaft; the impellers being of opposite pitch so that upon rotation fluid is pumped oppositely through said housings at sufficient pressure to force a portion of the fluid downwardly through the slots and against the bottom of the tank for heat and sediment distributing purposes; and means for releasing the aqueous solution from the tank.

3. An apparatus for producing an aqueous calcium polysulfide comprising a tank having a substantially semicylindrical bottom wall; means mounting the tank disposing the bottom wall in substantially horizontal position; means for delivering water, sulfur and lime to the tank; an auxiliary housing mounted externally on the bottom wall of the tank defining a heat chamber thereagainst; means for supplying heat to the chamber; a pair of axially aligned substantially cylindrical housings mounted longitudinally in the tank adjacent to the bottom wall thereof, said housings having spaced inner ends and outer ends providing discharge openings, each of said housings having a longitudinal slot of substantially uniformly decreasing width from its inner end to its outer end and disposed in spaced relation closely adjacent to said bottom wall of the tank; a shaft journaled longitudinally in the tank concentrically of the housings; a helical screw impeller mounted on said shaft within each of the housings; powered means externally of the tank having driving connection to the shaft, the impellers being of opposite pitch so that upon shaft rotation fluid is pumped from the spaced inner ends of the housings oppositely longitudinally out the outer ends thereof under sufficient pressure to force a portion of the fluid downwardly against the bottom of the tank for heat and sediment distribution purposes; and means for discharging fluid contents of the tank.

4. An apparatus for producing aqueous calcium polysulfide comprising a tank having a substantially semicylindrical bottom wall; means mounting the tank, disposing the bottom wall in substantially horizontal position; means for introducing water, sulfur and lime into the tank; an auxiliary housing mounted externally on the bottom wall of the tank defining a heat chamber thereagainst; a burner extended through an opening in said auxiliary housing for supplying heat to the chamber; a pair of axially aligned substantially cylindrical housings mounted longitudinally in the tank in spaced relation adjacent to the bottom wall thereof, said housings having spaced inner inlet ends and outer discharge ends, each of said housings having a longitudinal slot of substantially uniformly decreasing width from the inner end to the outer end of the housing and disposed in spaced relation closely adjacent to the bottom wall of the tank; a shaft journaled in the tank concentrically of the housings; a helical screw impeller mounted on said shaft within each of the housings; power means externally of the tank having driving connection to the shaft, the impellers being of opposite pitch so that upon rotation fluid is pumped from the spaced inner ends of the housings oppositely longitudinally through the outer discharge ends thereof under sufficient pressure to force a portion of the fluid downwardly against the bottom of the tank for heat and sediment distributing purposes; and means for discharging fluid contents of the tank.

5. A portable mixing mechanism for manufacturing aqueous calcium polysulfide solution from dry sulfur and lime materials comprising an elongated mobile frame having opposite forward and rearward ends; an elongated tank having a substantially cylindrical side wall concentrically circumscribing an axis for the tank and opposite forward and rearward end walls, the tank also having a lower semi-cylindrical bottom wall adapted to contain water; and an upper semi-cylindrical top wall upwardly extended therefrom, said top wall providing an upper opening into the tank spaced substantially equidistantly between said end walls; means borne by said forward end of the frame for introducing water into said tank; an elongated impeller shaft having opposite end portions journaled in said opposite end walls of the tank and extended in longitudinally parallel relation below the axis of the tank, and located in an upright plane substantially coincident with the axis of the tank; a shell disposed externally about the bottom and the end walls of the tank defining a chamber therebetween; a burner extended into said chamber through an opening in said rearward end wall of the tank for heating said chamber and such materials therein; powered means mounted on said forward end of the frame having driving connection to the shaft; a pair of sets of screw impellers respectively mounted on opposite end portions of the shaft having inner ends spaced from each other to provide a material receiving area therebetween and below the discharge end of the material conveyor, the impellers on each portion of the shaft having oppositely pitched helically disposed blades so that the impellers force water axially outwardly from said receiving area toward their respective end walls of the tank; a pair of coaxial longitudinally spaced tubular frusto-conical housings individually having opposite inner and outer open ends and a slot of substantially uniformly decreasing width longitudinally extended from the inner end to the outer end of the housing, said housings being individually concentrically disposed about said sets of impellers, and rigidly mounted in the tank with said slots disposed in spaced relation closely adjacent to said bottom wall of the tank; a crew conveyor having a dry material receiving end mounted on said forward end of the frame and angularly upwardly extended therefrom through the forward end wall of the tank to terminate in an upper dry material discharge end within the tank; a hopper mounted on said forward end of the frame opening into said lower end of the conveyor for constraining and feeding material into the conveyor for delivery to the tank whereby such material gravitates into said receiving area, is divided by the oppositely pitched impellers, and is circulated with the water through said tubular housings with the slots permitting a portion of the water and material to sweep against said lower wall portion of the tank to minimize settling of the material thereon, and means for releasing the aqueous calcium polysulfide solution from the tank.

6. An apparatus for producing a solution of a solid solute in a liquid solvent comprising a tank having a bottom wall providing contiguous oppositely inclined portions which downwardly converge to an elongated substantially horizontal area of sediment collection, means for admitting liquid solvent and solid solute to the tank, the solute tending to settle to the area of collection until dissolved in the solvent, an elongated tubular frusto-conical housing mounted in the tank above said area of collection longitudinally thereof and adjacent thereto, said housing having open opposite ends of different diameters and an elongated slot extended longitudinally of the housing disposed downwardly toward the area of collection, a power driven impeller mounted in the housing adapted to force the solvent, solvent borne solute and solution therethrough from the larger end to the smaller end at a velocity sufficient to cause an increase in pressure in the housing sufficient to project the same downwardly through the slot against the bottom wall of the tank along the area of collection, and means for releasing the solution from the tank.

7. An apparatus for producing a solution of a solid solute in a liquid solvent comprising a tank having a bottom wall providing contiguous oppositely inclined portions which downwardly converge to an elongated substantially horizontal area of sediment collection, means for admitting liquid solvent and solid solute to the tank, the solute tending to settle to the area of collection until dissolved in the solvent, means for heating the tank along said area of sediment collection, an elongated tubular frusto-conical housing mounted in the tank above said area of collection longitudinally thereof and adjacent thereto, said housing having open opposite ends of different diameters and an elongated slot extended longitudinally of the housing disposed downwardly toward the area of collection, a power driven impeller mounted in the housing adapted to force the solvent, solvent borne solute and solution therethrough from the larger end to the smaller end at a velocity sufficient to cause an increase in pressure in the housing sufficient to project the same downwardly through the slot against the bottom wall of the tank along the area of collection to stir solute which settles in such area to minimize heat deterioration thereof and to enhance dissolving thereof in the solvent, and means for releasing the solution from the tank.

8. An apparatus for producing aqueous solutions of a solid solute comprising a tank having a substantially horizontal semi-cylindrical bottom wall, means for admitting water and solid solute to the tank, said solute tending to settle to the lowest part of the bottom wall of the tank, an elongated tubular frusto-conical housing mounted in the tank adjacent to the semi-cylindrical bottom wall thereof, said housing having open opposite ends of different capacities and an elongated slot extended longitudinally of the housing disposed downwardly toward the semi-cylindrical bottom wall, a power driven impeller mounted in the housing adapted to force liquid therethrough from the end of larger capacity toward the end of smaller capacity at a velocity sufficient to cause an increase in pressure in the housing sufficient to project liquid downwardly through the slot against the bottom wall of the tank, and means for releasing the aqueous solution from the tank.

References Cited by the Examiner

UNITED STATES PATENTS 1,517,522   12/24   Volck     23—138
2,760,820   8/56   Cirese     23—272.7

FOREIGN PATENTS 564,708   10/44   Great Britain.

MORRIS O. WOLK, *Primary Examiner.*

JAMES H. TAYMAN, JR., *Examiner.*